C. E. KARNES.
KAFIR AND CANE HEADER.
APPLICATION FILED APR. 1, 1913.

1,085,209.

Patented Jan. 27, 1914.
2 SHEETS—SHEET 1.

Clarence E. Karnes,
Inventor

Witnesses by C. A. Snow & Co.
Attorneys

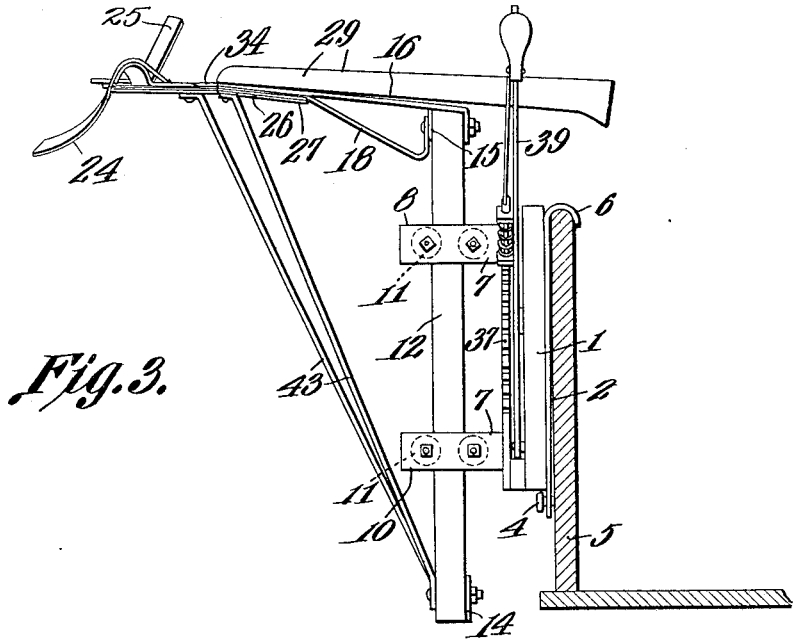
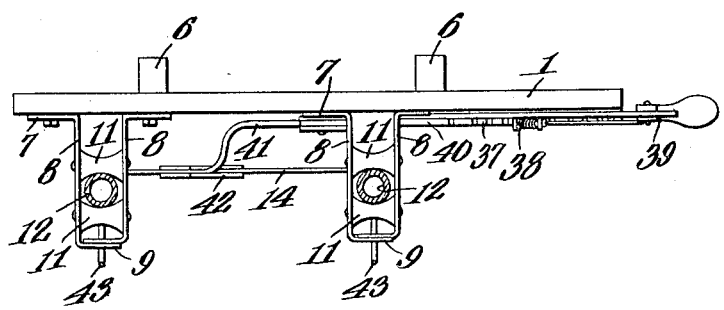
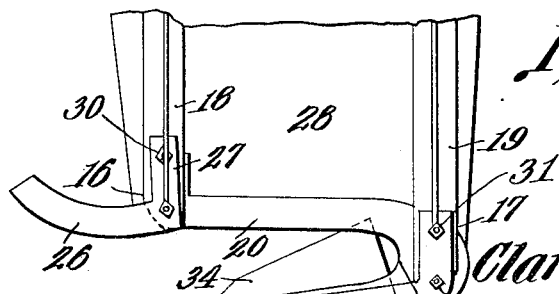

UNITED STATES PATENT OFFICE.

CLARENCE E. KARNES, OF HAZELTON, KANSAS.

KAFIR AND CANE HEADER.

1,085,209.

Specification of Letters Patent.   Patented Jan. 27, 1914.

Application filed April 1, 1913.   Serial No. 758,276.

*To all whom it may concern:*

Be it known that I, CLARENCE E. KARNES, a citizen of the United States, residing at Hazelton, in the county of Barber and State of Kansas, have invented a new and useful Kafir and Cane Header, of which the following is a specification.

The device forming the subject matter of this application is adapted to be employed for cutting the heads off Kafir corn, cane and like crops.

One object of the present invention is to provide a header of the type above described, the receiving platform of which may be adjusted vertically.

Another object of the invention is to provide a header of the type above mentioned, the cutting blade of which may be adjusted toward and away from the platform.

Another object of the invention is to provide novel means for directing the corn or cane upon the edge of the knife and for directing the severed head on the platform.

The invention aims to provide a header in which the deflecting elements, the blade and accessory parts are assembled in a novel manner.

It is within the scope of the invention to improve generally and to increase the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
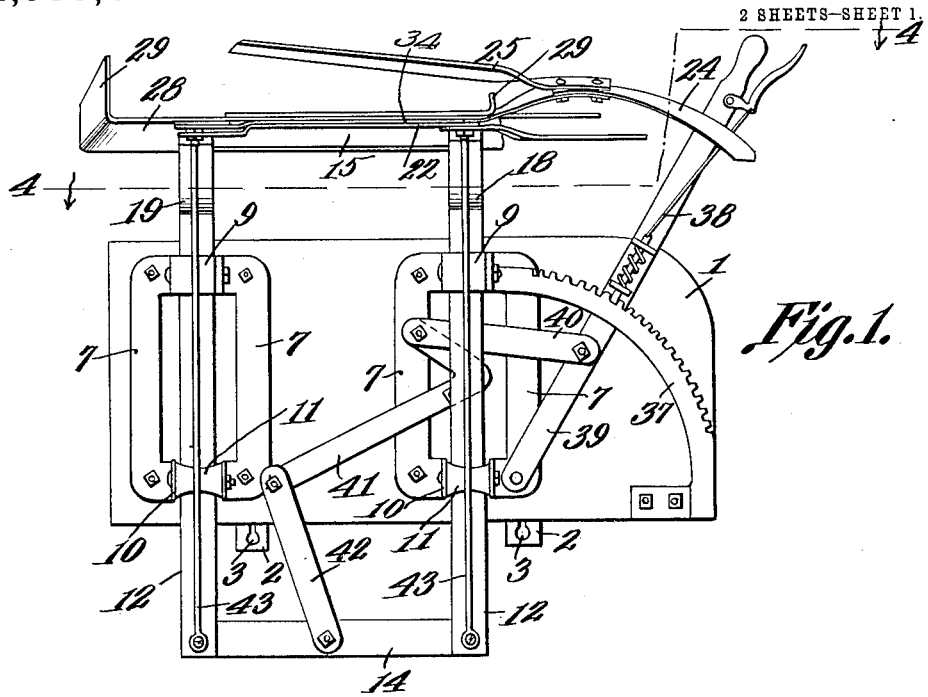
Figure 2:
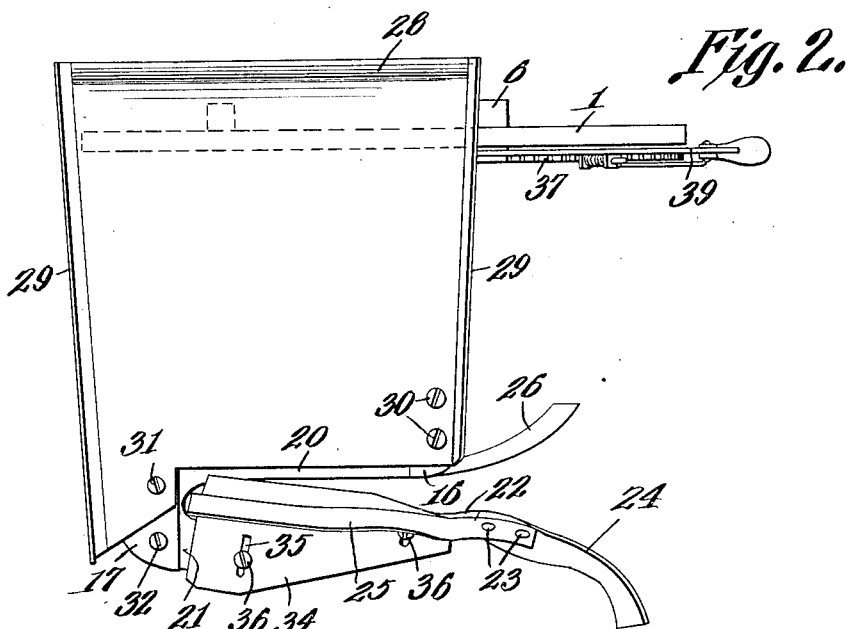

In the drawings:—Figure 1 is a side elevation; Fig. 2 is a top plan; Fig. 3 is an end elevation; Fig. 4 is a sectional plan view on the line 4—4 of Fig. 1; and Fig. 5 is a fragmental bottom plan.

In carrying out the invention there is provided a support 1 which may be in the form of a back plate, the support 1 being equipped on its rear face with suspension strips 2 provided at their lower ends with keyhole slots 3 adapted to engage studs 4 on a supporting structure 5, such as a wagon box or a hay rake. The suspension strips 2 are equipped at their upper ends with hooks 6 which are engaged over the upper edge of the supporting structure 5.

Brackets 7 are secured to the support 1, the brackets having outstanding upper arms 8, the ends of which may be overlapped upon each other as indicated at 9. The brackets 7 are provided with lower arms 10.

Pairs of rollers 11 are journaled in the arms 8 and 10 and mounted to slide vertically between the rollers 11 are uprights 12, connected at their lower ends by a cross bar 14 and connected at their upper ends by a cross bar 15.

Supports 16 and 17 outstand from the parts 12 and are upheld by braces 18 and 19. Referring particularly to Figs. 2 and 3 it will be observed that the support 17 and the brace 19 are slightly longer than the support 16 and the brace 18. The supports 16 and 17 are united by a cross bar 20 which is curved as indicated at 21, adjacent the outer end of the support 17 to form a forwardly extended arm 22. Attached to the arm 22 by means of securing elements 23 is a curved, inclined wing 24. The securing elements 23 hold in place another wing 25 which extends in an opposite direction from the wing 24, the wing 25 being inclined at an angle to the horizontal.

It is obvious that, if desired, the wings 24 and 25 may be fashioned in one piece. A curved deflector 26 is located opposite to the wing 24, the deflector 26 being provided with an extension 27. A platform 28 is superposed upon the supports 16 and 17 and is provided along its edges with flanges 29. Securing elements 30 unite the platform 28, one end of the cross piece 20, the extension 27 of the deflector 26 and the ends of the support 16 and the brace 18. A securing element 31 unites the platform 28, the curved portion 21 of the arm 20, the brace 19 and the support 17. Another securing element 32 unites all of the parts last above mentioned, with the exception of the platform 28. An angular brace 33 is held against the lower face of the arm 22 and is engaged by the securing elements 32 and 31. A blade 34 is superposed on the arm 21, the blade 34 having slots 35 engaged by bolt and nut structures 36 or the like, the bolt and nut structures 36 passing through the arm 22 and through the brace 33.

A segment 37 is secured to the support 1 and to one of the brackets 7, the segment 37 being adapted to be engaged by latch mechanism 38 mounted upon a lever 39 which is fulcrumed on the support 1. The intermediate portion of the lever 39 is connected by a link 40 with a bell crank lever 41 fulcrumed intermediate its ends upon the support 1, one end of the bell crank lever 41 being connected by a link 42 with the cross bar 14.

The outer ends of the members 16 and 18, and 17 and 19 may be united with the lower ends of the uprights 12 by means of braces 43. When the device is manufactured, the parts 16 and 18, and 17 and 19 may be shortened so as to bring the blade 34 near to the wagon box 5, and under such circumstances, the braces 43 may not be necessary.

In practical operation, as the vehicle moves forwardly, the corn or cane will be engaged between the deflector 26 and the wing 24 and be directed against the cutting edge of the blade 34. The heads of the corn or cane will be severed by the cutting edge of the blade 34 and the wing 25 will serve to direct the severed heads of corn to the downwardly and inwardly inclined platform 28, from which the severed heads will fall into the wagon box.

The structure may be raised and lowered. In order to accomplish this result, the lever 39 is manipulated, the link 40 actuating the bell crank lever 41 and the bell crank lever 41 through the medium of the link 42 effecting a raising and lowering of the frame comprising the uprights 12 and the platform 28, the uprights 12 moving smoothly and antifrictionally between the rollers 11.

Having thus described the invention, what is claimed is:—

1. In a header of the type described, a flat, vertical support; guides on said support; uprights mounted to slide in the guides; a platform carried by the uprights; a knife held spaced from the edge of the platform; a cross bar connecting the lower ends of the uprights; a bell crank fulcrumed above the cross bar and on the support for swinging movement in a plane parallel to the support and comprising a long arm and a short arm, both arms projecting between the uprights and lying in a common plane; and a lever fulcrumed on the support; means for holding the lever in adjusted positions; a link connecting the lever, above its fulcrum, with the short arm of the bell crank; and a downwardly extended link connecting the long arm of the bell crank with the cross bar.

2. In a header of the type described, a support; a platform projecting therefrom; a curved member comprising an arm disposed adjacent the platform and an arm spaced from the platform; a blade supported upon the last specified arm; a deflector located adjacent one corner of the platform and including an angular extension prolonged beneath the platform; a support engaging brace having its outer end bound between the extension and the platform; a reinforcing member applied to the last specified arm and including an extension prolonged beneath the platform; and a support engaging brace having its outer end engaged with the extension of the reinforcing member, with the curved member and with the platform.

In testimony that I claim the foregoing as my own, I have hereto affixed my signature in the presence of two witnesses.

CLARENCE E. KARNES.

Witnesses:
J. H. DRAKE,
J. F. LICKLIDER.

Copies of this patent may be obtained for five cents each, by addressing the "Commissioner of Patents, Washington, D. C."